(12) United States Patent
Willacker et al.

(10) Patent No.: US 11,171,530 B2
(45) Date of Patent: Nov. 9, 2021

(54) STATOR INTERCONNECTION DEVICE FOR A ROTATING ELECTRIC MACHINE

(71) Applicant: ZF FRIEDRICHSHAFEN AG, Friedrichshafen (DE)

(72) Inventors: Katja Willacker, Wiesentheid (DE); Jochen Wittmann, Burkardroth (DE); Roland Lindwurm, Sennfeld (DE); Christoph Wieder, Küps (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 111 days.

(21) Appl. No.: 16/625,966

(22) PCT Filed: May 23, 2018

(86) PCT No.: PCT/EP2018/063504
§ 371 (c)(1),
(2) Date: Dec. 23, 2019

(87) PCT Pub. No.: WO2019/001852
PCT Pub. Date: Jan. 3, 2019

(65) Prior Publication Data
US 2020/0169139 A1    May 28, 2020

(30) Foreign Application Priority Data

Jun. 30, 2017   (DE) .................... 10 2017 211 168.2

(51) Int. Cl.
*H02K 3/50*    (2006.01)
*H02K 5/22*    (2006.01)
(Continued)

(52) U.S. Cl.
CPC .............. *H02K 3/50* (2013.01); *H02K 3/345* (2013.01); *H02K 3/522* (2013.01); *H02K 5/225* (2013.01); *H02K 2203/09* (2013.01)

(58) Field of Classification Search
CPC ............ H02K 3/522; H02K 3/50; H02K 3/12; H02K 3/28; H02K 3/38; H02K 15/0062;
(Continued)

(56) References Cited

U.S. PATENT DOCUMENTS

2005/0023910 A1* 2/2005 Lukenich ............... H02K 3/522
                                                  310/71
2005/0189828 A1* 9/2005 Nakayama ............. H02K 3/522
                                                  310/71
(Continued)

FOREIGN PATENT DOCUMENTS

DE   102014218725   3/2016
DE   102016200115   7/2017
(Continued)

OTHER PUBLICATIONS

Endo et al, Wiring Member for Rotating Electric Machine, Sep. 14, 2006, Sumitomo Electric Industries, JP 2006246594 (English Machine Translation) (Year: 2006).*

(Continued)

*Primary Examiner* — Quyen P Leung
*Assistant Examiner* — Alexander A Singh
(74) *Attorney, Agent, or Firm* — Cozen O'Connor

(57) ABSTRACT

An interconnection device for a stator winding having connection conductors constructed as annular disks, coaxially stacked, and electrically insulated with respect to one another. Each connection conductor has fastening openings distributed in circumferential direction for fixing the interconnection device to a stator. The connection conductors are stacked such that the fastening openings are positioned to form a fastening passage The connection conductors are axially spaced apart from one another and are overmolded with a plastic to form a metal/plastic composite part. At least two kinds of fastening openings are provided, which form (Continued)

larger fastening openings and smaller fastening openings. A larger fastening opening and a smaller fastening opening are formed at a fastening passage, and an annular space, which extends from a boundary of the larger fastening opening to a boundary of the smaller fastening opening, is filled by the plastic.

10 Claims, 7 Drawing Sheets

(51) Int. Cl.
*H02K 3/52* (2006.01)
*H02K 3/34* (2006.01)

(58) Field of Classification Search
CPC ........ H02K 5/225; H02K 15/02; H02K 1/146; H02K 2203/09; H02K 3/345
USPC .......... 310/71, 216.005, 179, 146, 150, 132, 310/416; 29/596
See application file for complete search history.

(56) References Cited

U.S. PATENT DOCUMENTS

| | | | |
|---|---|---|---|
| 2006/0068617 A1* | 3/2006 | Migita | H02K 3/522 439/76.2 |
| 2008/0175732 A1 | 7/2008 | Sakata | |
| 2011/0297474 A1* | 12/2011 | Aono | H02K 3/522 180/443 |
| 2015/0097453 A1 | 4/2015 | Nishikawa et al. | |
| 2015/0263580 A1* | 9/2015 | Houzumi | H02K 3/50 310/43 |
| 2016/0218578 A1* | 7/2016 | Yamada | H02K 15/0068 |

FOREIGN PATENT DOCUMENTS

| | | |
|---|---|---|
| JP | 2006246594 | 9/2006 |
| JP | 2006246594 A * | 9/2006 |

OTHER PUBLICATIONS

Office Action for the corresponding German Patent Application No. 10 2017 211 168.2.

* cited by examiner

STATOR INTERCONNECTION DEVICE FOR A ROTATING ELECTRIC MACHINE

CROSS REFERENCE TO RELATED APPLICATIONS

This is a U.S. national stage of Application No. PCT/EP2018/063504 filed May 23, 2018. Priority is claimed on German Application No. DE 10 2017 211 168.2 filed Jun. 30, 2017 the content of which is incorporated herein by reference.

BACKGROUND OF THE INVENTION

1. Field of the Invention

The present invention is directed to a stator interconnection device for a rotating electric machine, to a stator, and to an electric machine.

2. Description of the Prior Art

A generic interconnection device for a stator of an electric machine is described, for example, in German Patent Application 102016200115.9. The interconnection device therein serves to connect stator coils arranged in a circular shape at a stator lamination stack by winding bodies to coil ends. The interconnection device has a plurality of connection conductors arranged coaxial to one another and electrically insulated from one another by insulating layers. The connection conductors are constructed as annular disks and are arranged at the stator in an axially staggered manner. For arrangement at the stator, each connection conductor has fastening portions formed as recesses and which are arranged axially covering one another and so that the connection conductors can be secured jointly at a respective connection element provided at a winding body of the stator and which is formed as a protruding pin. In such an arrangement of comparatively closely stacked connection conductors, special steps are required to reliably prevent voltage breakdowns and, therefore, unwanted short circuits particularly at the peripheral areas of the above-mentioned recesses.

SUMMARY OF THE INVENTION

It is the object of one aspect of the present invention to provide a space-saving, low-cost, and voltage-proof interconnection device of the type mentioned in the introductory part, a stator, and an electric machine with an interconnection device of this type.

According to a first aspect of the invention, an interconnection device for a stator winding of a rotating electric machine is suggested, which comprises a plurality of connection conductors constructed as annular disks, coaxially stacked, and electrically insulated with respect to one another, and each connection conductor has a plurality of fastening openings distributed in circumferential direction for fixing the interconnection device to a stator. The connection conductors are stacked in such a way that the fastening openings are positioned axially relative to one another in sets and substantially cover one another to form a common fastening passage. The interconnection device is characterized in that the connection conductors are axially spaced apart from one another and are overmolded with a plastic so that the interconnection device forms a metal/plastic composite part, particularly a plastic injection molded part. At least two kinds of fastening openings with a different opening width are provided, which form a smaller fastening opening and a larger fastening opening. With two adjacent connection conductors, a smaller fastening opening and a larger fastening opening are formed at a fastening passage, and an annular space which extends from a boundary of the larger fastening opening to a boundary of the smaller fastening opening is filled by the plastic.

An axially compact interconnection device is made possible in that the connection conductors are formed as annular disks, particularly from a ribbon-shaped or plate-shaped copper semi-finished product. The connection conductors of the interconnection device are accordingly provided for axially staggered arrangement at a stator, for which purpose the connection conductors with a set of fastening openings in each instance can be fitted collectively in each instance to a fastening element provided at a stator and can be permanently fixed thereto. The above-mentioned fastening openings are advantageously constructed as circular recesses, for example, punches, with a different diameter.

The advantage in forming fastening openings of different sizes at axially adjacent connection conductors consists in that peripheral areas of these connection conductors located at a circumferential position are father apart than the axial spacing of, i.e., the axial intermediate space between, these connection conductors. Accordingly, an air gap and creepage distance of connection conductors at different electric potentials can be enlarged and the dielectric strength can be increased.

When a plurality of connection conductors are stacked, it is possible in principle to form the connection conductors in an alternating manner with only one type of fastening opening, respectively, to achieve the advantage described above. However, this would have the disadvantage that the current-carrying connection conductors have a different effective cross section and, therefore, a different electric resistance, which leads to an irregular or asymmetrical current distribution in the winding system of an electric machine.

It is advantageous in this respect to provide two kinds of fastening openings with different size, i.e., particularly with different diameter, at a connection conductor in each instance and to distribute them substantially symmetrically at a connection conductor. To this end, the different fastening openings can be formed to alternate preferably in circumferential direction so that a large fastening opening and a smaller fastening opening are adjacent in circumferential direction.

It is further provided to overmold or encapsulate the connection conductors with a plastic and, in so doing, to fill a respective larger fastening opening with the plastic considered from the peripheral area thereof approximately up to the boundary of the smaller fastening opening, i.e., to partially fill a larger fastening opening. The dielectric strength is further increased in the area of the fastening openings by introducing the insulating plastic. An injection-moldable thermoplastic or thermoset material is advantageously used for overmolding the interconnection device. Alternatively, an elastomer can also be used, for example, depending on the application and on installation space or environmental conditions.

Accordingly, the interconnection device is provided as a premade constructional unit for arranging at a stator. In particular, this interconnection unit can be produced as a tooling-free assembly component part with comparatively appreciably reduced process steps and assembly steps.

For arranging the interconnection device at the front side of the stator, the stator-side connection conductor forms a contact surface in the area of a fastening opening for contacting a stator-side fastening area or fastening element. Accordingly, irrespective of the specific construction of a fastening opening present in the connection area, there is always a contact surface available with the same cross section. Further, all contact surfaces are preferably formed in a common radial plane. Alternatively, the contact surfaces can also be formed in different planes. However, this would result in disadvantages with respect to manufacture.

Partial filling of the larger fastening openings also has advantages on the front side of the interconnection device facing away from the stator. When arranged at the stator, a contact surface which is independent from the respective circumferential position and the respective type of fastening opening provided and which is accordingly identical is likewise formed at this location for a stator-side fastening element, for example, a fastening head. Accordingly, these contact surfaces can be arranged in the same plane, which offers advantages for automated production.

Insofar as fastening openings of different sizes are present at a circumferential position when connection conductors are stacked, an axial passage with a constant inner width, particularly with a constant inner diameter, can be generated by introducing plastic, as mentioned above, over the axial extension of these connection conductors. Accordingly, a stator-side fastening element can carry the interconnection device over its entire axial extension, which allows for improved fastening.

According to an advantageous configuration of the invention, it is provided that the two types of fastening openings with different opening width are provided at a connection conductor. The fastening openings are preferably arranged on a common pitch circle, corresponding fastening elements being formed at the stator likewise on a pitch circle identical to the latter. The different types of fastening openings can be formed to alternate in circumferential direction. Further advantageously, the fastening openings can be distributed at the interconnection device on two pitch circles with different diameters.

According to an advantageous further development of the invention, centering openings can be provided at the connection conductors to receive the plurality of connection conductors coaxially and so as to be spaced apart from one another in a tool, particularly for overmolding with plastic in a molding tool.

Further advantageously, it is suggested that the connection conductors are stacked such that the centering openings are positioned axially relative to one another in sets and substantially cover one another to form a centering passage, wherein at least two types of centering openings with a different opening width are provided at each of the connection conductors and form a smaller centering opening and a larger centering opening, and the connection conductors are stacked such that a smaller centering opening and a larger centering opening are arranged axially adjacent to one another in a set of centering openings, and an annular space which extends from the boundary of the respective larger centering opening at most almost to the boundary of the smaller centering opening, but which does not include this direct boundary, is filled with plastic.

This means that an annular gap or an annular space remains at one of the connection conductors between the annular space that is filled with plastic and the boundary of the smaller centering opening, which annular gap or angular space can receive a centering pin of the tool during injection molding or encapsulation of the structure, and the centering pin can be supported in a surface area located at least slightly outside of the boundary of the smaller centering opening by a supporting surface, particularly a shoulder area. Two centering pins advantageously engage or catch in each instance in a smaller centering opening of this kind from each of the two front sides of a connection conductor. At the same time, the centering pins can advantageously extend through the other connection conductor with a lateral distance through the comparatively larger centering openings without contacting.

In a particularly advantageous manner, the centering openings with different diameters can be distributed at the connection conductors in such a way that only one of the connection conductors in each instance forms a centering opening with the smaller diameter at a given circumferential position of the interconnection device.

In this way, connection conductors can be arranged in a tool concentrically and at the same time so as to be axially adjacent through centering pins arranged in a circle with supporting surfaces formed on different levels so that the insulating substance, i.e. the plastic, can penetrate into the provided axial and lateral intermediate spaces.

Further, the above-described fastening openings can likewise be used to arrange and position the interconnection device in a tool in that a plurality of centering pins with an outer diameter approximately corresponding to the inner diameter of the smaller fastening openings engage in these fastening openings.

The connection conductors advantageously have coil connection areas for coil ends of a stator winding and power connection areas for the power supply of an electric machine. The coil connection areas can be formed for this purpose as radially inwardly or outwardly protruding protuberances which are particularly advantageously arranged in a common radial plane and/or on a common circumferential area or pitch circle for connecting with coil ends of a stator. Alternatively, the coil connection areas may, of course, also be arranged in different planes.

To further reduce an axial dimension of the interconnection device, recesses which are spaced apart along the circumference can be provided at the axially staggered connection conductors, and coil connection areas of the further connection conductors are axially guided through these recesses or can engage therein.

An automated manufacture of the stator can advantageously be made possible in a simple manner in that coil ends are preferably arranged on a common axial and radial position, and two circumferentially adjacent coil ends of two respective coils are associated with one and the same connection conductor.

Power connection areas which, like the coil connection areas, are advantageously formed integral with the connection conductors can be provided at the stator for connecting the electric machine to an external power source, and a radially inwardly or outwardly protruding protuberance is provided in each instance at the connection conductors and can receive a connection element such as, for example, a press-in nut. Alternatively, the connection conductors and the power connection areas can also be formed of two parts, respectively. In a further advantageous manner, a power connection area can be formed with a greater material strength or material thickness with respect to a base body of the connection conductor.

According to a further aspect of the invention, a stator of an electric machine is suggested, wherein an interconnection device with at least one of the features mentioned above is provided at this stator.

In particular, the stator can comprise a stator winding with a plurality of stator coils, and the interconnection device is fixed to connection elements of winding bodies of the stator coils.

The winding bodies can be produced from a plastic, particularly an injection-moldable plastic, so that corresponding connection elements can easily be formed at the latter. Holding projections such as pins projecting from the winding body, for example, in axial direction, can serve as connection elements for cooperating with the above-mentioned recesses of the connection conductors, and the interconnection device can be placed on these projections as premade constructional unit and hold the connection conductors permanently and captively, for example, by a subsequent thermal deformation of the pins. Alternatively, it is also possible to fasten by clamps, catch elements, or the like techniques.

A winding body can further have a winding area which is formed by a winding carrier and two legs which define the winding area in axial direction and are connected with the winding carrier. The connection element can be formed at a leg at which the connection conductors can be arranged axial to or radial to the winding area. Connection elements can also be provided at both legs for reliably fixing the interconnection device to the stator.

According to yet another aspect of the invention, an electric machine with a rotor is suggested, which electric machine comprises a stator with at least one of the above-mentioned features.

BRIEF DESCRIPTION OF THE DRAWINGS

The invention will be described by way of example in the following with reference to an embodiment form shown in the figures.

The drawings show.

DETAILED DESCRIPTION OF THE PRESENTLY PREFERRED EMBODIMENTS

Figure 1:
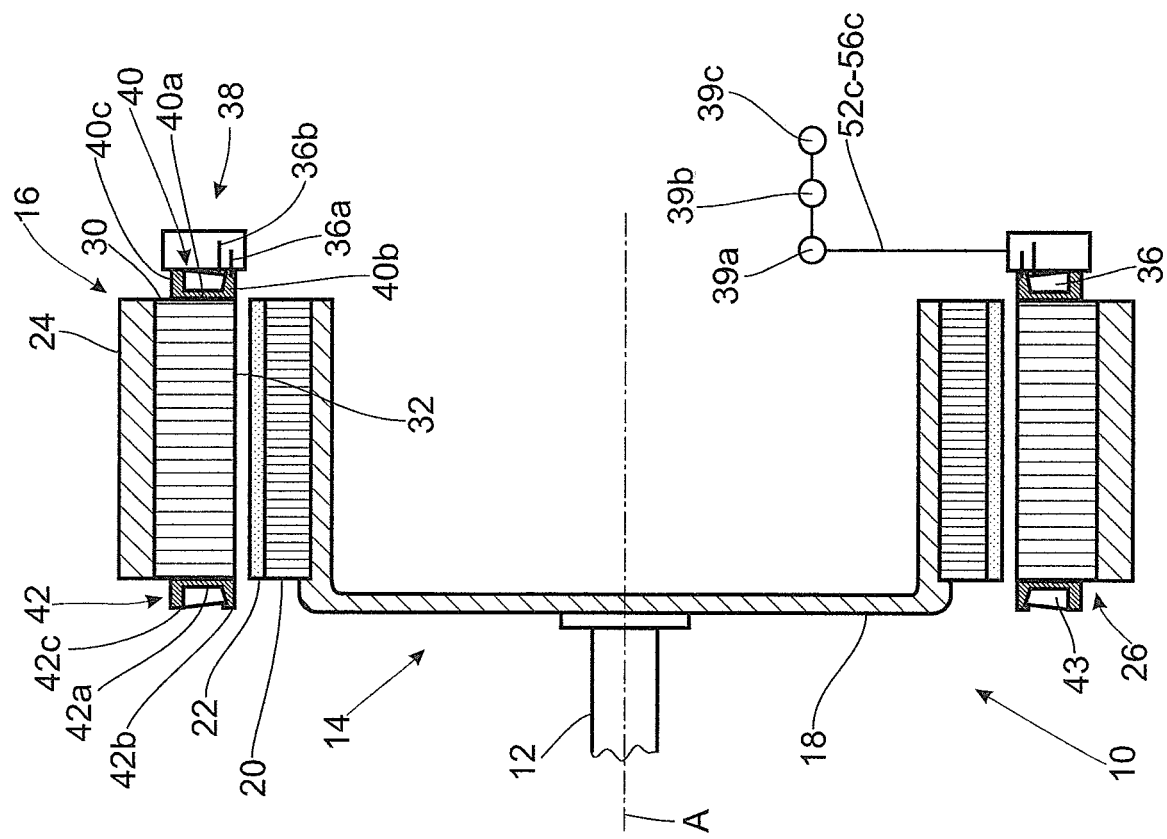
FIG. 1 is a schematic diagram showing an electric machine with a stator and an interconnection device.
Figure 2:
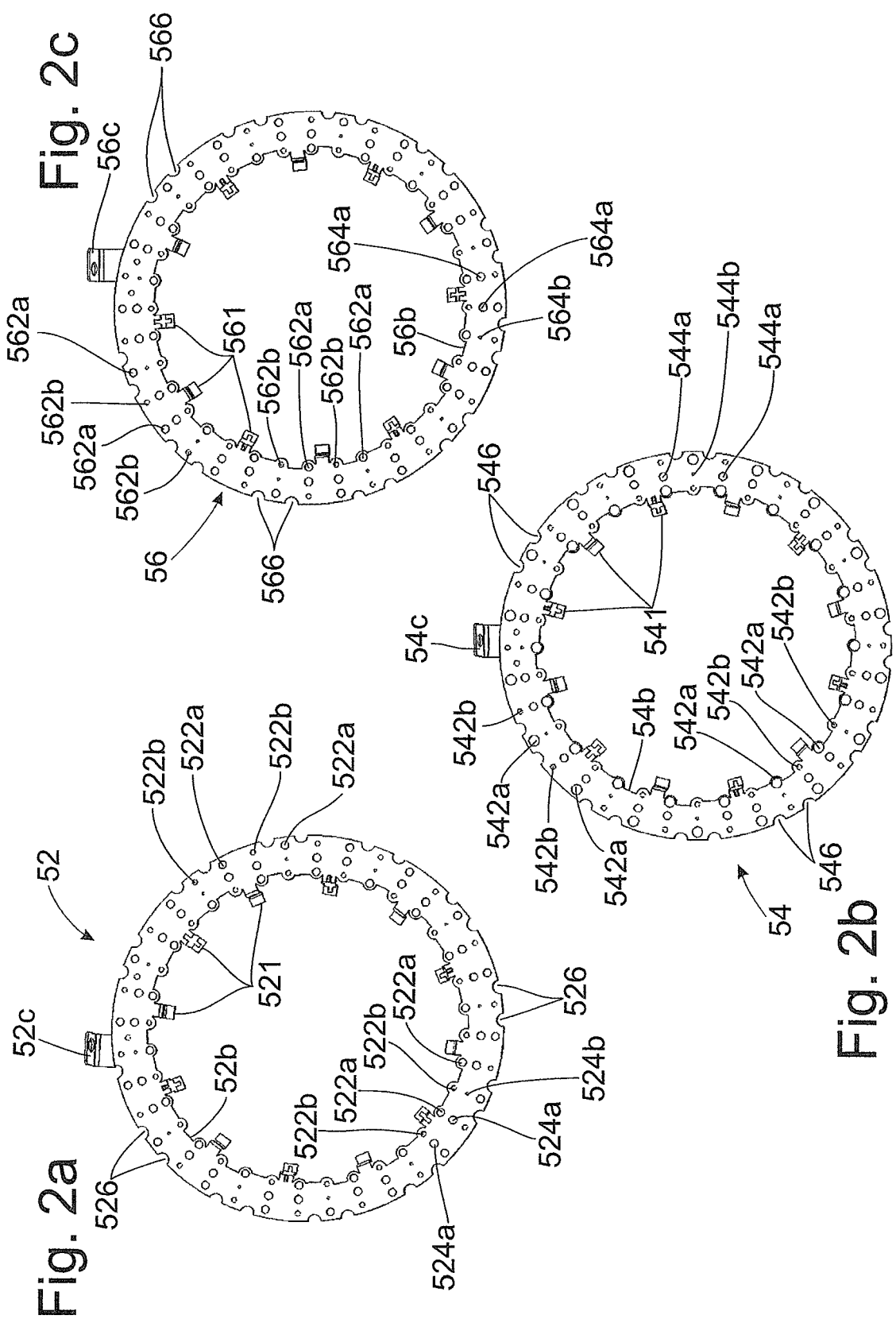
FIGS. 2a-c are individual connection conductors of the interconnection device.
Figure 3:
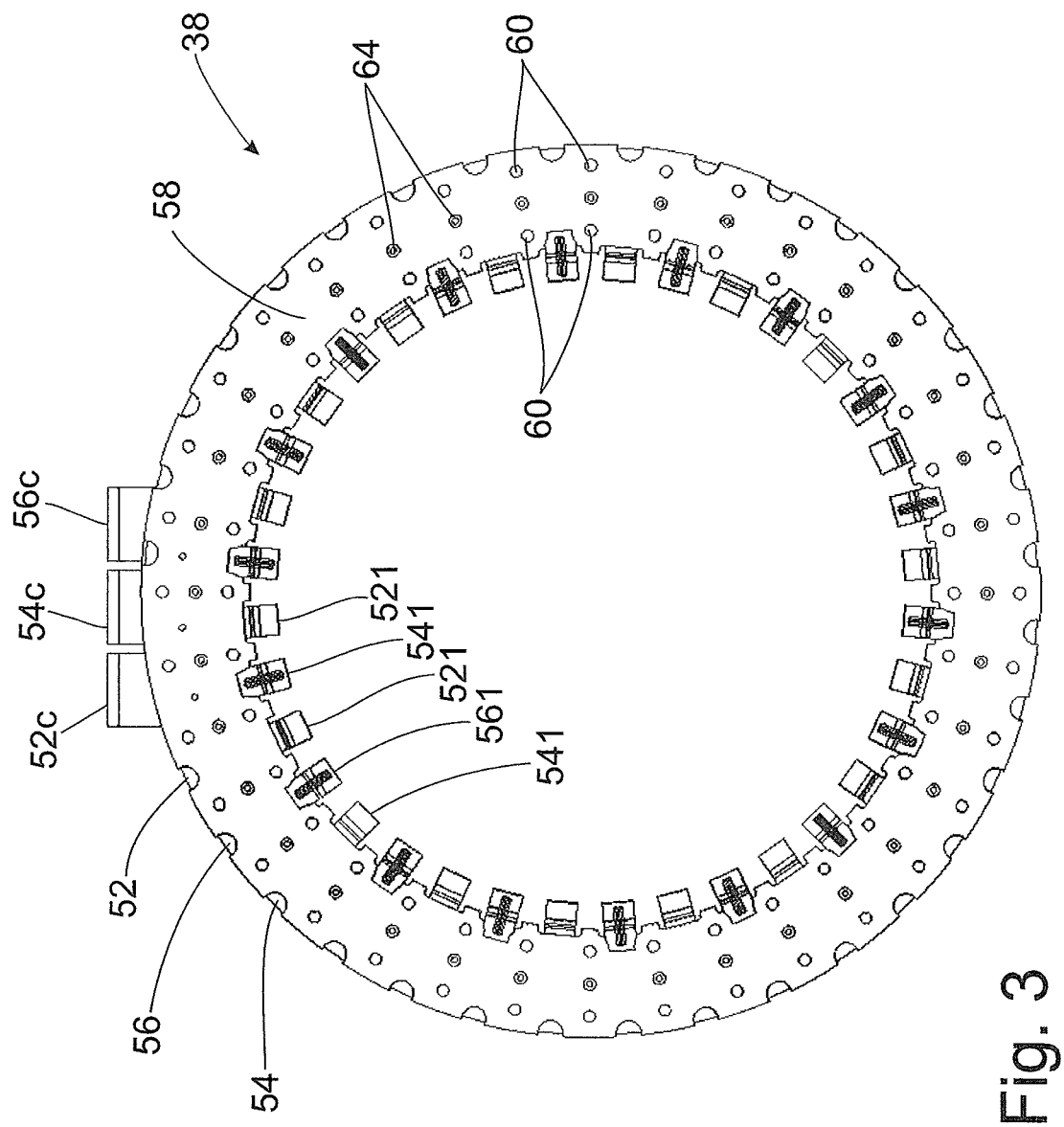
FIG. 3 is a diagram of an interconnection device in a top view.
Figure 4:
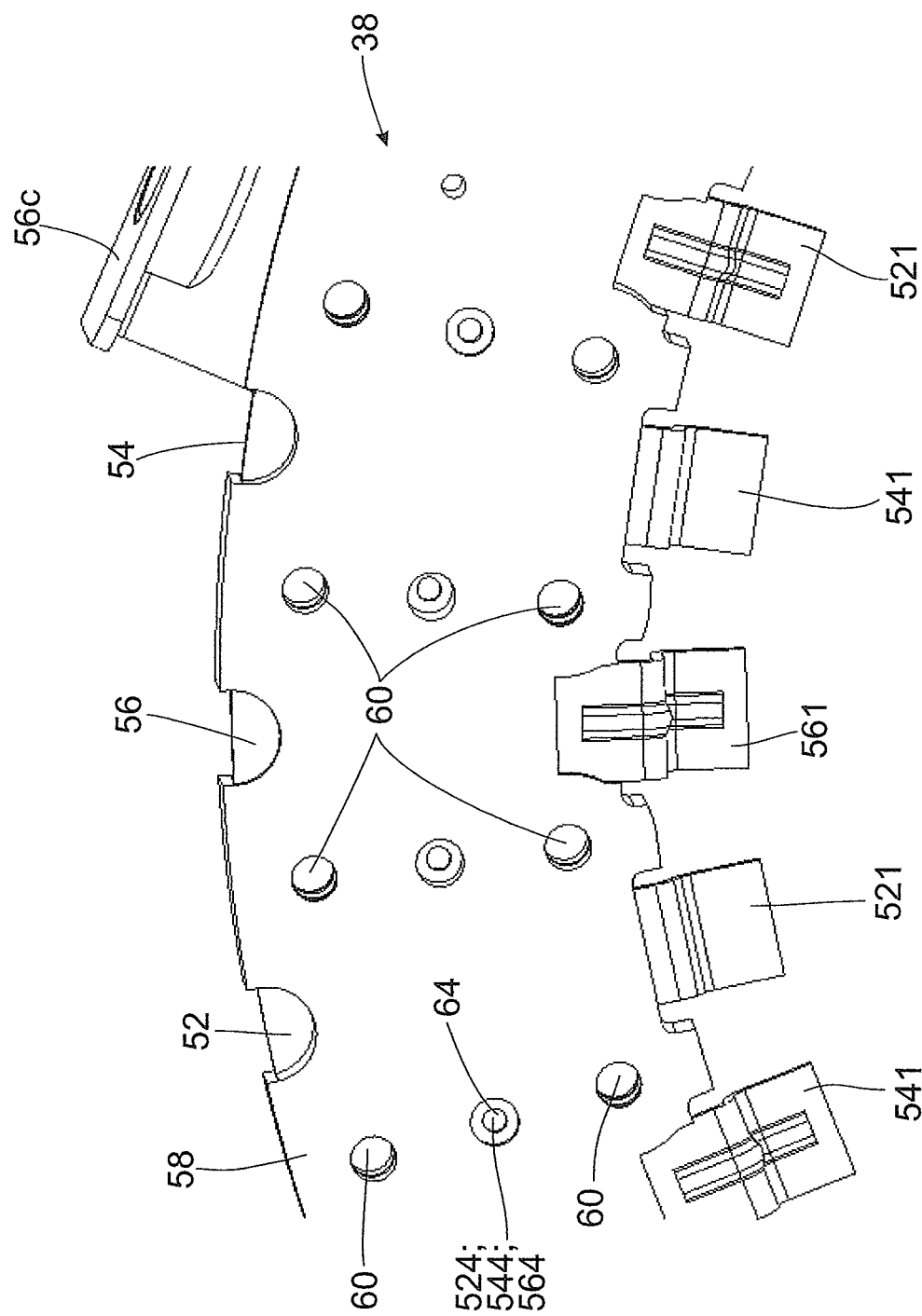
FIG. 4 is an enlarged section of the interconnection device from FIG. 3.

FIG. 1 schematically shows an electric machine 10, more accurately an inrunner type permanently excited electric synchronous machine, with a rotor 14 that is rotatable around a rotor shaft 12 with a rotational axis A and with a stator 16 radially outwardly surrounding the rotor 14. Rotor 14 comprises a pot-shaped rotor carrier 18. A rotor lamination stack 20, which carries a plurality of permanent magnets 22 spaced apart from one another at the circumference, is arranged on the cylindrical outer circumferential surface of the rotor carrier 18.

Stator 16 comprises an annular stator carrier 24 and an annular stator lamination stack 26, which is also formed of sheet metal laminations is arranged in the central recess of the stator carrier 24. Accordingly, rotational axis A simultaneously forms the center axis A of stator 16. The stator carrier 24 can be, for example, an outer housing or intermediate housing of the electric machine 10.

The stator lamination stack 26 comprises an annular stator yoke 30, which contacts the stator carrier 24 and teeth 32 that project radially inwardly from this stator yoke 30 and outfitted with a plurality of stator coils 36 to form a stator winding. These stator coils 36 are wound from a copper wire around the teeth 32 by two insulating and winding bodies 40, 42 comprising heat-resistant plastic and are prevented from slipping. The winding bodies 40, 42 in each instance comprise a base area or winding carrier 40a; 42a contacting the front of the lamination stack 26 and two legs 40b, c; 42b, c, which project therefrom approximately at right angles and axially at the stator 16 and which bound a winding area 43 in radial direction.

Coils 36 are associated with electrically individual strands, for which purpose the coil ends 36a, b are connected to one another in a predetermined manner by an interconnection device 38 shown only schematically in FIG. 1 as a block. The exact construction of the interconnection device 38 will be explained in more detail later in the description.

As will be seen from the following FIGS. 2-7, the interconnection device 38 comprises a plurality of connection conductors 52, 54, 56 which are insulated from one another by insulators, particularly a plastics matrix 58, and which have coil connection areas 521, 541, 561 spaced apart circumferentially for contacting the coil ends 36a, b. In the embodiment example with the connection conductors 52-56 mentioned above, the interconnection device 38 is fixed to the winding bodies 40 as will be explained in more detail and as is shown in the further figures.

The interconnection device 38 is connected via power connection areas 52c, 54c, 56c of connection conductors 52-56 with power electronics 39a and control electronics 39b with an electric energy source 39c (FIG. 1), which can apply current of variable phase and amplitude to the winding for operating the electric machine 10.

In the present case, connection conductors 52-56 are produced from a semi-finished copper product, particularly from a copper plate or a copper sheet metal, as annular disks by means of a stamping process. The connection conductors 52-56 are spaced apart axially from one another and overmolded with a plastic forming a matrix 58 so that the interconnection device is formed as a metal/plastic composite part, particularly as an injection molded plastic part. Accordingly, connection conductors 52-56 are embedded in the plastics matrix 58, and only individual areas of the annular base bodies and coil connection areas 521, 541; 561 and power connection areas 52c, 54c, 56c are freely accessible. The interconnection device 38 is arranged with the axially staggered connection conductors 52-56 at stator 16 coaxial to the center axis A.

The coil connection areas 521-561 are initially formed as radial protuberances at the radially inner circumferential area of the annular disk-shaped connection conductors 52-56 and are then bent in a common lateral plane, where they are arranged (FIG. 7) parallel to the interconnection and, in the example, axially adjacent to the radially inwardly oriented coil ends 36a, b.

The depicted embodiment example shows the interconnection of the coil ends 36a, b for implementing a delta circuit with three connection conductors 52-56 in each instance. Further, as will be seen from the dash-dot lines in FIG. 7, two adjacent coil ends 36a, b of two coils 36 adjacent to one another along the circumference are also connected to coil connection areas 521-541 of one of the connection conductors 52, 54, 56, which coil connection areas 521-541 are directly adjacent to one another. Recesses 52b, 54b, 56b are provided in each instance at a connection conductor 52, 54, 56 at the areas extending in circumferential direction between the coil connection areas, and the coil connection areas 521-561 of the two further connection conductors 52-56 are guided axially through these recesses 52b, 54b, 56b or can engage therein. These recesses are designated by way of example in FIGS. 2a-c.

The contacting of coil ends 36a, b with connection conductors 52-56 is carried out by bonding, particularly by soldering or welding.

Every connection conductor 52-56 has a plurality of fastening openings 522, 542, 562 distributed in circumferential direction for fixing the interconnection device 38 to the stator 16. Connection conductors 52-56 are stacked in such a way that the fastening openings 522-562 are positioned axially with respect to one another in sets so as to substantially cover one another while forming a common fastening passage 60 in each instance. Two types of fastening openings 522-562 with a different opening width are provided at a connection conductor 52-56 and form larger fastening openings 522a-562a and smaller fastening openings 522b-562b (FIG. 2a-c).

Figure 5:
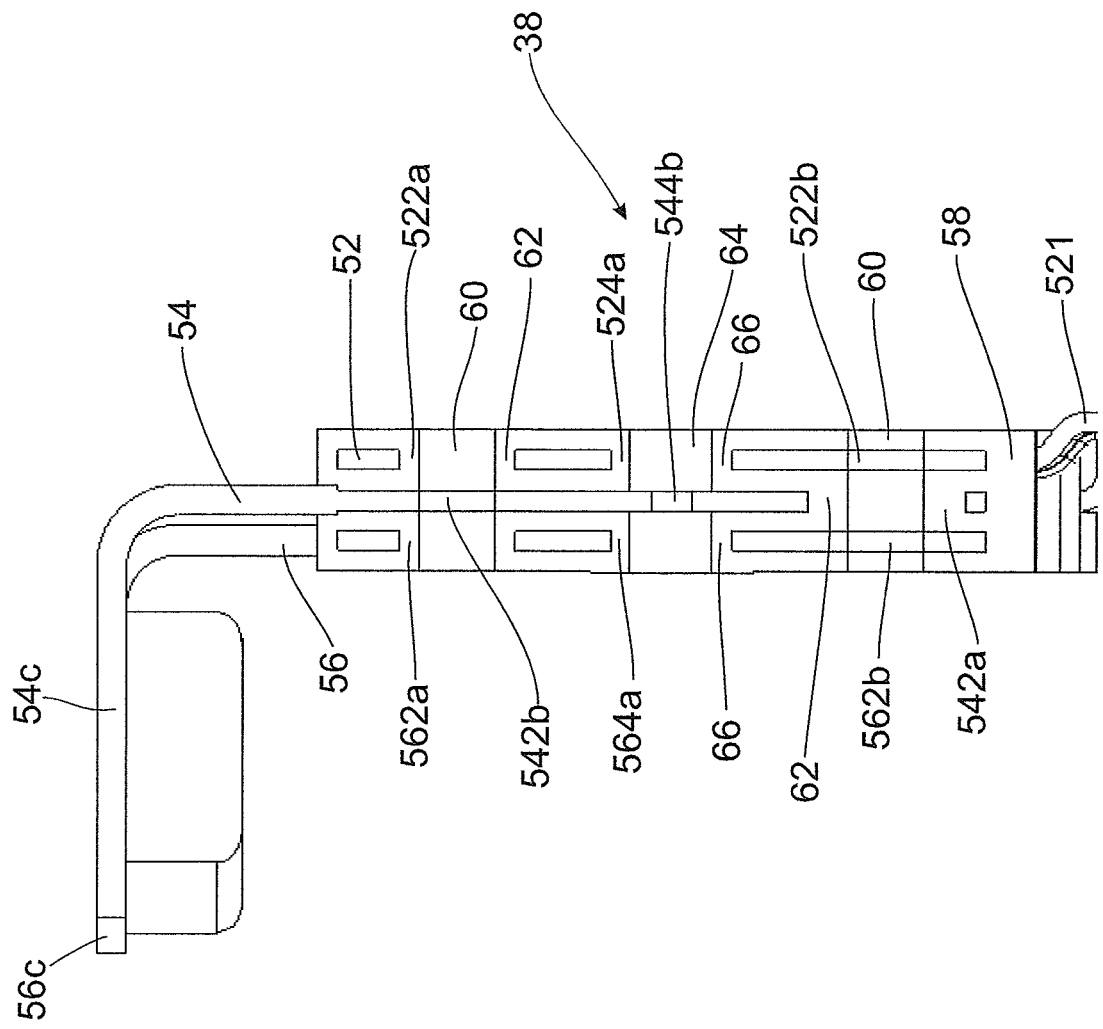
FIG. 5 is a partial axial section through the interconnection device from FIG. 3.

It can be discerned from FIG. 5 that with two adjacent connection conductors 52, 54, a larger fastening opening 522a and a smaller fastening opening 542b are formed at a fastening passage 60. It will further be seen that an annular space 62 which extends from a boundary of the larger fastening opening 522a to a boundary of the smaller fastening opening 542b is likewise filled with the plastic 58. Accordingly, the gap between the boundaries of two axially adjacent fastening openings is increased by this construction and is filled with a dielectric at the same time due to the absence of the plastic 58 so that an air gap and creepage distance and, therefore, the dielectric strength between two connection conductors at different electric potentials is increased.

Corresponding to the circumferential distribution of the fastening openings 522-562, connection elements in the form of axially protruding pins 40e, f are formed at the legs 40b, c of the winding bodies 40, 42, which pins 40e, f receive the axially stacked connection conductors 52-56 by means of the fastening passages 60 and fix them in the occupied position, for example, by means of subsequent hot staking or another connection technique, possibly incorporating further connection elements. As is shown in FIG. 6, pins 40e, f can form mushroom-like fastening heads 401e, f which radially overlap the plastics matrix 58 and the fastening passages 60.

Figure 6:
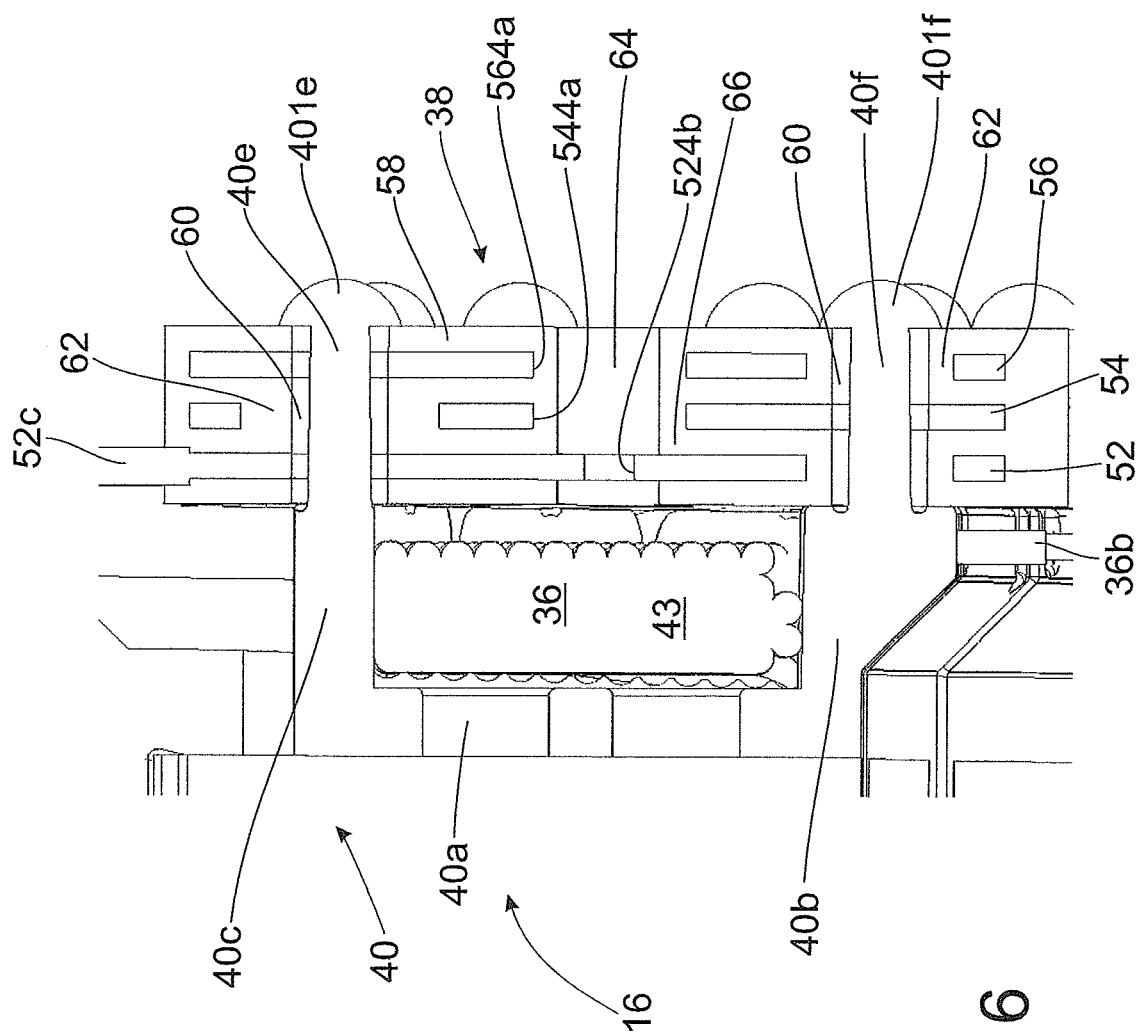
FIG. 6 is a partial axial section through an interconnection device according to FIG. 3 that is fixed to winding bodies of a stator.
Figure 7:
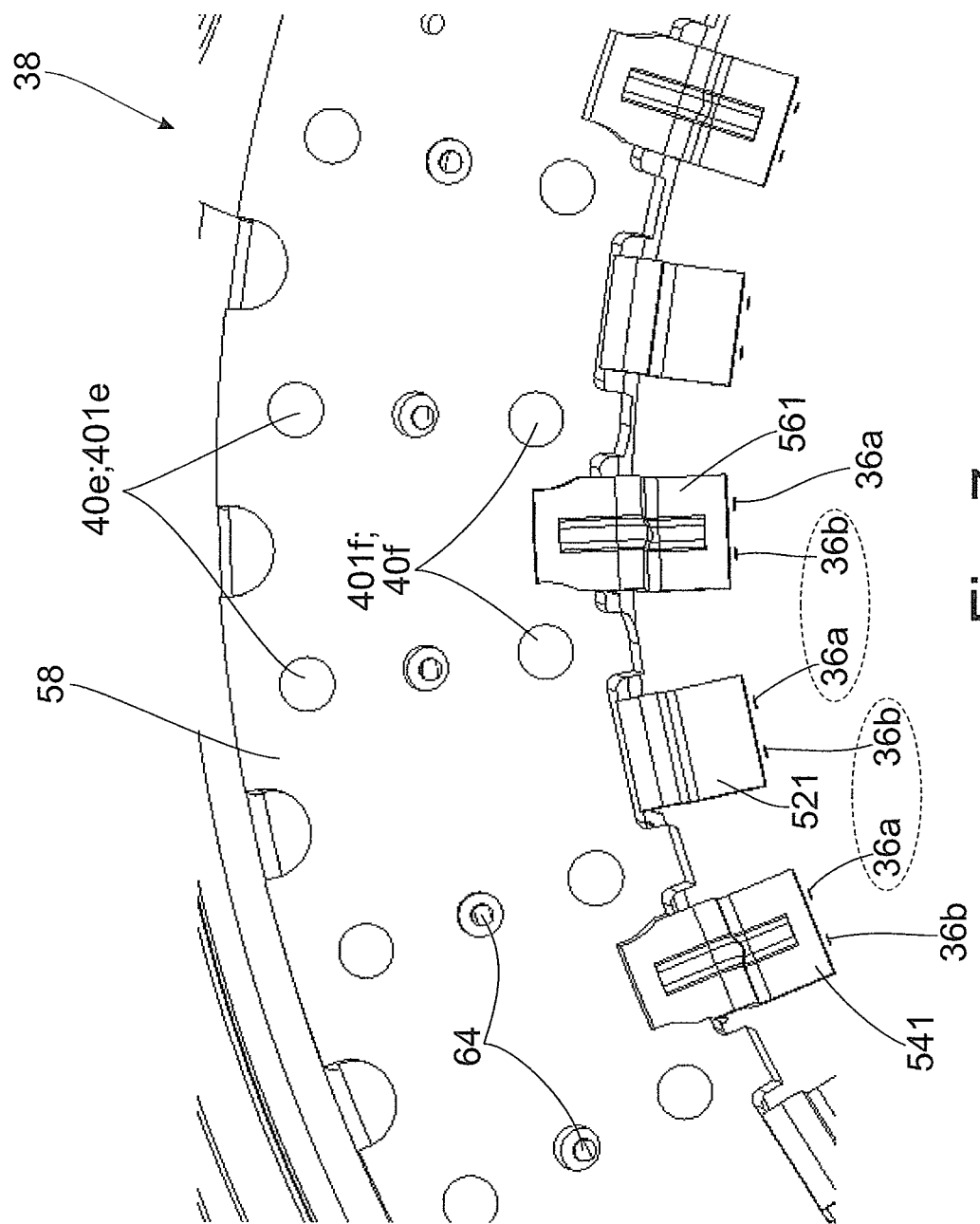
FIG. 7 is a sectional top view of an arrangement according to FIG. 6.

Accordingly, it can be discerned when FIGS. 2-7 are viewed together that the fastening openings 522-562 of connection conductors 52-56 are arranged to axially cover one another and that, accordingly, connection conductors 52-56 are fixed in common to a connection element 40e, f of a winding body 40 in each instance. In FIG. 6, the connection conductors 52-56 are arranged axially with respect to winding areas 43.

In order to form the plastics matrix 58, the individual connection conductors 52-56 are received in a defined manner by centering pins of a molding tool, not shown in the drawings, for which purpose centering openings 524-564 are provided at the connection conductors 52-56 in order to hold the connection conductors 52-54 in the tool coaxially and so as to be spaced apart from one another.

The connection conductors 52-56 are stacked in such a way that the centering openings 524-564 are positioned in sets axially relative to one another and substantially cover one another to form centering passages 64. At least two types of centering openings 524-564 with a different opening width are provided at each of the connection conductors 52-56 and form larger centering openings 524a-564a and smaller centering openings 524b-564b. The connection conductors 52-56 are stacked in such a way that, in a set of centering openings 524-564, a larger centering opening 524a-526a and a smaller centering opening 524b-526b are arranged axially adjacent to one another. This forms an annular space 66 which extends from the boundary of the respective larger centering opening 524a-526a at most almost to the boundary of the smaller centering opening 524b-526b but does not include this direct boundary. This annular space 66 is likewise filled with plastic 58.

As will be seen especially clearly in FIG. 6, the centering openings 524-564 with different diameters are distributed in such a way that, at a given circumferential position of the interconnection device 38, only one of the connection conductors 52-56 in each instance forms a centering opening 524b-564b with the smaller diameter. Further, centering openings 524-564 are distributed in circumferential direction at one of the connection conductors 52-56 in each instance such that two larger centering openings 524a-564a are followed in each instance by a smaller centering opening 524b-564b.

Referring to FIGS. 2a-c, it will be seen that evenly distributed semicircular recesses 526, 546, 566 are formed at the outer circumferential area of connection conductors 52-56, the intermediate spaces therebetween being closed circumferentially except for the fastening openings 522-562. Connection conductors 52-56 are stacked in such a way that only two recesses 526, 546; 526, 566; 546, 566 and an intermediate space are in register axially at a determined circumferential position, so that one of the connection conductors 52-56, respectively, can be held in this position at a molding tool. After the plastic is introduced, the individual connection conductors 52-56 in these positions are released as can be seen clearly at the molded interconnection device according to FIGS. 3, 4. The areas of connection conductors 52-56 not covered with plastic, particularly in the area of centering openings 524-554 and in the area of recesses 526-556, can dissipate heat losses directly into the environment and accordingly bring about an improved cooling of the connection conductors.

Referring to FIG. 1, the power connection areas 52c, 54c, 56c are likewise formed as radial protuberances proceeding from the annular base body and have a larger effective electric cross section compared to coil connection areas 521, 541, 561. These protuberances are formed radially outwardly at connection conductors 52, 54, 56 in FIGS. 2, 3 and 5.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An interconnection device for a stator winding of a rotating electric machine, comprising:
   a plurality of connection conductors constructed as annular disks and coaxially stacked and which are electrically insulated with respect to one another, wherein each connection conductor has a plurality of fastening openings distributed in circumferential direction and configured to fix the interconnection device to a stator;
   a fastening passage formed by stacking the plurality of connection conductors such that the plurality of fastening openings are positioned axially relative to one another in sets and substantially cover one another;
   a metal/plastic composite part formed by the plurality of connection conductors arranged axially spaced apart from one another and being overmolded with a plastic; and
   an axial passage with a constant inner diameter defined by the plastic over an axial extension of the connection conductors,
   wherein the plurality of fastening openings comprise at least two kinds of fastening openings with different opening widths, which form larger fastening openings and smaller fastening openings,
   wherein, with two adjacent connection conductors, a larger fastening opening and a smaller fastening opening are formed at a fastening passage,
   wherein an annular space which extends from a boundary of the larger fastening opening to a boundary of the smaller fastening opening is filled entirely by the plastic.

2. The interconnection device according to claim 1, wherein the at least two kinds of fastening openings with a different opening width are provided at a connection conductor.

3. The interconnection device according to claim 1, wherein centering openings are provided at the plurality of connection conductors to receive the plurality of connection conductors coaxially and so as to be spaced apart from one another by a molding tool.

4. The interconnection device according to claim 3, wherein the plurality of connection conductors are stacked such that the centering openings are positioned axially relative to one another in sets and substantially cover one another to form a centering passage,
   wherein at least two types of centering openings with a different opening width are provided at each of the plurality of connection conductors and form a larger centering opening and a smaller centering opening,
   wherein the plurality of connection conductors are stacked such that, in a set of centering openings, a larger centering opening and a smaller centering opening are arranged axially adjacent to one another, and
   wherein an annular space that extends from a boundary of the respective larger centering opening at most almost to a boundary of the smaller centering opening, but which does not include this direct boundary, is filled with the plastic.

5. The interconnection device according to claim 4, wherein centering openings with different diameters are distributed in such a way that only one of the plurality of connection conductors in each instance forms a centering opening with the smaller centering opening at a given circumferential position of the interconnection device.

6. The interconnection device according to claim 1, wherein the plurality of connection conductors have respective coil connection areas for coil ends of a stator winding and power connection areas for a power supply of an electric machine, wherein the coil connection areas are formed as radially inwardly or outwardly protruding protuberances arranged in a common radial plane for connecting with coil ends of a stator.

7. The interconnection device according to claim 1, wherein a recess is provided at a connection conductor in which a coil connection area of a further connection conductor engages.

8. A stator of an electric machine, comprising:
   an interconnection device, comprising:
   a plurality of connection conductors constructed as annular disks and coaxially stacked and which are electrically insulated with respect to one another, wherein each connection conductor has a plurality of fastening openings distributed in circumferential direction and configured to fix the interconnection device to a stator;
   a fastening passage formed by stacking the plurality of connection conductors such that the fastening openings are positioned axially relative to one another in sets and substantially cover one another;
   a metal/plastic composite part formed by the plurality of connection conductors arranged axially spaced apart from one another and being overmolded with a plastic; and
   an axial passage with a constant inner diameter defined by the plastic over an axial extension of the connection conductors,
   wherein the fastening openings comprise at least two kinds of fastening openings with different opening widths, which form larger fastening openings and smaller fastening openings,
   wherein, with two adjacent connection conductors, a larger fastening opening and a smaller fastening opening are formed at a fastening passage,
   wherein an annular space which extends from a boundary of the larger fastening opening to a boundary of the smaller fastening opening is filled entirely by the plastic.

9. The stator according to claim 8, wherein the stator comprises a stator winding with a plurality of stator coils, wherein the interconnection device is fixed to connection elements of winding bodies of the plurality of stator coils.

10. An electric machine comprising:
    a rotor; and
    a stator of an electric machine, comprising:
      an interconnection device, comprising:
        a plurality of connection conductors constructed as annular disks and coaxially stacked and which are electrically insulated with respect to one another, wherein each connection conductor has a plurality of fastening openings distributed in circumferential direction and configured to fix the interconnection device to a stator;
        a fastening passage formed by stacking the plurality of connection conductors such that the fastening openings are positioned axially relative to one another in sets and substantially cover one another; and a metal/plastic composite part formed by the plurality of connection conductors arranged axially spaced apart from one another and being overmolded with a plastic; and an axial passage with a constant inner diameter defined by the plastic over an axial extension of the connection conductors, wherein the fastening openings comprise at least two kinds of fastening openings with different opening widths, which form larger fastening openings and smaller fastening openings, wherein, with two adjacent connection conductors, a larger fastening opening and a smaller fastening opening are formed at a fastening passage, wherein an annular space which extends from a boundary of the larger fastening opening to a boundary of the smaller fastening opening is filled entirely by the plastic.

* * * * *